US009551291B2

(12) United States Patent
Ioja et al.

(10) Patent No.: US 9,551,291 B2
(45) Date of Patent: Jan. 24, 2017

(54) STEEL PISTON WITH FOURTH LAND GUIDANCE AND IMPROVED FRICTION CHARACTERISTICS

(71) Applicant: Mahle International GmbH, Stuttgart (DE)

(72) Inventors: Valerian Ioja, Farmington Hills, MI (US); Michael T. Lapp, Bloomfield, MI (US)

(73) Assignee: Mahle International GmbH (DE)

( * ) Notice: Subject to any disclaimer, the term of this patent is extended or adjusted under 35 U.S.C. 154(b) by 335 days.

(21) Appl. No.: 14/166,020

(22) Filed: Jan. 28, 2014

(65) Prior Publication Data

US 2014/0208941 A1    Jul. 31, 2014

(51) Int. Cl.
*F16J 1/01*      (2006.01)
*F02F 3/26*      (2006.01)
(Continued)

(52) U.S. Cl.
CPC ............... *F02F 3/26* (2013.01); *F02F 3/0015* (2013.01); *F16J 1/01* (2013.01); *F16J 1/02* (2013.01);
(Continued)

(58) Field of Classification Search
CPC ....................................... F16J 1/04; F02F 3/26
See application file for complete search history.

(56) References Cited

U.S. PATENT DOCUMENTS 4,354,426 A  *  10/1982  Steidle ..................... F02F 3/02
                                                       92/235
4,669,366 A  *   6/1987  Ellermann ............... F02F 3/08
                                                       92/225
(Continued)

FOREIGN PATENT DOCUMENTS

DE         8422986 U1     2/1986
EP         1614885 A2     1/2006
(Continued)

OTHER PUBLICATIONS

International Search Report for PCT/US2014/013335 mailed Apr. 10, 2014.
(Continued)

*Primary Examiner* — Thomas E Lazo
(74) *Attorney, Agent, or Firm* — Fishman Stewart PLLC

(57) ABSTRACT

Steel pistons used in many internal combustion engines are generally composed of a skirt and a crown. The skirt's function is to reduce the lateral and rotational movement of the piston in the cylinder while the engine is in operation. Lateral and rotational frictional forces imparted to a piston during engine operation cause the piston to scrape off the lubricating oil film present on the cylinder wall. The reduced oil film thickness increases piston and cylinder wall wear due to metal to metal contact. The subsequent metal to metal contact produces a phenomenon called scuffing. This disclosure incorporates several design modifications to the piston and results in a significant reduction of the lateral and rotational motion of the piston during engine operation. The
(Continued)

reduction of piston motion reduces the amount of oil film removed from the cylinder wall and increases lubrication efficiency. The Increased lubrication efficiency realized reduces frictional wear power loss and scuffing.

17 Claims, 2 Drawing Sheets

(51) Int. Cl.
    *F02F 3/00*     (2006.01)
    *F16J 1/02*     (2006.01)
    *F02F 3/10*     (2006.01)

(52) U.S. Cl.
    CPC .......... *F02F 3/10* (2013.01); *F02F 2003/0007* (2013.01)

(56) References Cited

U.S. PATENT DOCUMENTS

| | | | | |
|---|---|---|---|---|
| 4,674,399 A * | 6/1987 | Bruni | ........................ | F02F 3/02 123/193.6 |
| 4,704,950 A * | 11/1987 | Ripberger | ................ | F02F 3/02 123/193.6 |
| 5,261,363 A * | 11/1993 | Kemnitz | ............... | F02F 3/0015 123/193.6 |
| 5,487,364 A * | 1/1996 | Takeda | ...................... | F02F 3/00 123/193.6 |
| 5,505,171 A * | 4/1996 | Gazzard | .................. | C22C 47/08 123/193.6 |
| 6,763,757 B2 * | 7/2004 | Huang | ..................... | B21K 1/18 29/888.04 |
| 6,789,460 B2 * | 9/2004 | Kohnert | ................... | F02F 3/003 92/186 |
| 6,862,976 B2 * | 3/2005 | Gaiser | ....................... | F02F 3/22 92/186 |
| 7,104,183 B2 * | 9/2006 | Huang | ..................... | B21K 1/18 29/888.04 |
| 7,255,084 B2 * | 8/2007 | Savale | .................... | F02B 77/02 123/193.6 |
| 2011/0168016 A1 * | 7/2011 | Fedyna | ................... | B23P 15/10 92/255 |
| 2012/0160204 A1 * | 6/2012 | Scharp | ...................... | F02F 3/22 123/193.6 |

FOREIGN PATENT DOCUMENTS

FR            1454468 A     2/1966
WO     WO-2004088113 A1    10/2004

OTHER PUBLICATIONS

Bibliographic Data Sheet for DE8422986U1 indicating Abstract Not Available.
Biblipgraphic Data Sheet for FR1454468A with indicating Abstract Not Available.

* cited by examiner

STEEL PISTON WITH FOURTH LAND GUIDANCE AND IMPROVED FRICTION CHARACTERISTICS

CROSS-REFERENCE TO RELATED APPLICATIONS

This application claims priority to U.S. Provisional Patent Application No. 61/757,996, filed Jan. 29, 2013, and U.S. Provisional Patent Application No. 61/785,661, filed Mar. 14, 2013, the contents of which are hereby incorporated in their entirety.

BACKGROUND

The present disclosure relates to metal pistons used in internal combustion engines fueled by gasoline, diesel, alcohol or any other combustible fuel. Internal combustion engine pistons are usually composed of two elements; a skirt and crown. The crown may have a plurality of circumferentially extending lands spaced from a top of the land toward the piston skirt with a groove disposed between adjacent lands for receiving a piston ring. Therefore, pistons have a series of alternating lands and grooves fabricated into the crown of the piston. In some piston examples the skirt and crown are joined by a mechanical method, e.g. welding. Other examples cast or machine the pistons as a one piece skirt and crown.

In operation, a piston is received within a mating cylinder or liner of an internal combustion engine. A lubricant such as oil minimizes friction as the piston moves up and down within the cylinder, portions of the piston (e.g., the piston rings) coming into sliding contact with a cylinder wall surface.

In reality, however, during engine operation, pistons are subjected to lateral and rotational forces as they move up and down vertically within a cylinder, causing the pistons to move in an eccentric motion within the cylinder or liner of the internal combustion engine. The eccentric motion takes the piston out of the desired straight vertical path within the cylinder or liner. The off center piston alignment may cause portions of the skirt, piston rings and lands to scrape the lubricating oil off of the cylinder wall, respectively breaking through of the oil film forcing metal to metal contact.

It is known to have a land adjacent to an uppermost land, a so-called second land, and the skirt provide the vertical guidance for the piston in its mating cylinder during engine operation. In previous piston embodiments where there are multiple lands, the second land has a greater axial extent (e.g., is taller) than the other lands positioned below it (e.g. intermediate and bottom lands). Moreover, at most there is only a minimal oil film between the second land and the cylinder wall or liner during engine operation with limited lubrication and hence limited damping of the rocking motion of the reciprocating piston within the cylinder.

An approach to introduce a guidance land spaced away from the heat of combustion such as the bottom land has been developed to significantly dampen the kinetic forces that cause the eccentric and otherwise erratic piston movement within a mating cylinder during engine operation. Therefore, lubricant such as in the form of an oil film remains intact on the cylinder or liner wall. Metal to metal contact and wear, piston power loss through undesired frictional contact, and possible temperature spikes resulting from enhanced frictional contact are all reduced.

Reducing the lateral and rotational motion of the piston also reduces the noise generated by the phenomenon known as piston slap. Limiting unnecessary, detrimental movement and frictional contact of engine pistons also increases engine efficiency. The present disclosure combines several modifications to the piston crown and skirt, thereby resulting in greatly improved engine performance and efficiency.

SUMMARY

According to an exemplary illustration, there is provided a piston for use in an internal combustion engine. The piston has a central piston axis and three circumferentially recessed grooves machined into the piston. Between each groove is a circumferentially raised land that is cast into the piston. More specifically, a land positioned away from the heat of combustion such as the bottom land has a greater axial extent (e.g., is taller) than all but possibly the uppermost land (e.g., having a greater extent than the second land and an intermediate land). The increased axial extent or height of this land gives the piston increased operational performance characteristics. The piston skirt in this exemplary illustration may be shorter in height or axial extent as compared to previously known pistons. A shorter piston skirt axial extent advantageously lowers the center of gravity of the piston. A lower center of gravity increases the stability of the piston within the cylinder with regards to eccentric movement such as the contributing aspects of both lateral and rotational movement within the cylinder or liner during engine operation, particularly if the compression height (CH) is short (e.g., approximately 40 to 60% of the piston diameter)

Another exemplary illustration uses the bottom land as a component to limit both lateral and rotational movement of the piston during engine operation. In current piston constructions the land positioned below the uppermost land (e.g., the second land) is used for piston guidance. By moving the guidance land feature to a land further away from the heat of combustion such as the bottom land, the distance from the source of heat in the combustion chamber increases. The bottom land of the piston is exposed to less heat than the second land. The closer to the combustion chamber a point on the piston is, the hotter the temperature is at that point. The cooler the temperature of the land, the amount of thermal expansion seen by the land will be less. Less thermal expansion means a better control of the clearance between the piston and its mating surface since there is a reduced tolerance required to account for metal expansion because of heat. It becomes practical to reduce the clearance between the bottom land and the mating surface of the cylinder wall or liner and minimize undesired eccentric movement.

Another exemplary effect using the bottom land guidance is the hydrodynamic aspect where the oil control ring (OCR) located right above the guidance land scrapes the remaining oil on the cylinder wall or liner directly into the gap between bottom land and mating cylinder surface (e.g., liner). This oil cushion prevents asperity contact and therefore improves friction.

BRIEF DESCRIPTION OF THE DRAWINGS

Referring now to the drawings, exemplary illustrations are shown in detail. Although the drawings represent representative examples, the drawings are not necessarily to scale and certain features may be exaggerated to better illustrate and explain an innovative aspect of an illustrative example. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows.

DETAILED DESCRIPTION

The various features of the exemplary approaches illustrated and described with reference to any one of the figures may be combined with features illustrated in one or more other figures, as it will be understood that alternative illustrations that may not be explicitly illustrated or described may be able to be produced. The combinations of features illustrated provide representative approaches for typical applications. However, various combinations and modifications of the features consistent with the teachings of the present disclosure may be desired for particular applications or implementations. The representative illustrations below relate generally to a four-stroke, multi-cylinder, direct-injected, spark-ignition internal combustion engine. Artisans may recognize similar applications or implementations with other engine/vehicle technologies and configurations.

Figure 1:
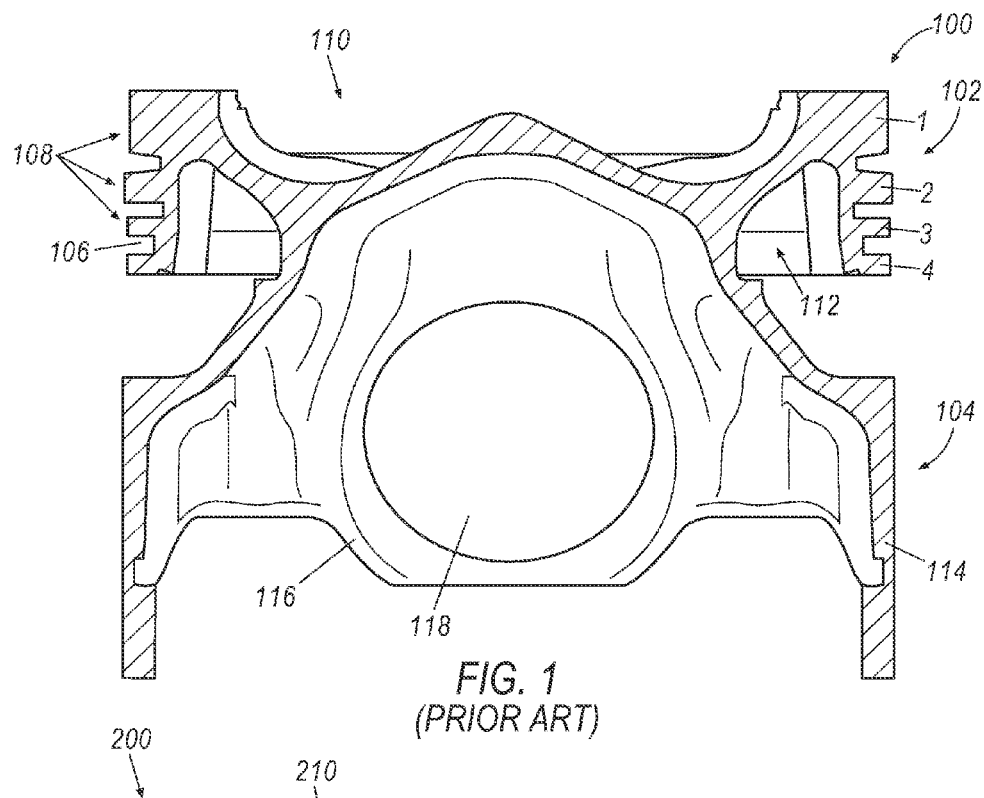
FIG. 1 is a cross-sectional isometric side view of a typical prior art piston for an internal combustion engine where the fourth land has a smaller axial extent relative to the second land from the top.

FIG. 1 is an isometric drawing of the side view of a prior art piston 100 without the advantages of the present disclosure. A piston 100 may include a piston crown 102 and a piston skirt 104 that may be fixed or otherwise connected with the crown (e.g., by way of a welding or casting). The crown 102 may include piston ring grooves 106 and related lands 108 extending circumferentially with two lands defining each groove 106. Additionally, the crown 102 may include a combustion bowl 110 and a cooling gallery 112. The piston skirt 104 generally supports the crown 102 during engine operation, e.g., by interfacing with surfaces of an engine bore or cylinder (not shown) during reciprocal motion. For instance, known skirts 104 may have an elongated outer surface 114 that generally defines a circular outer shape about at least a portion of a perimeter of the piston 100. The outer surface 114 may generally correspond to the engine bore or cavity surfaces, which may be generally cylindrical. Known pistons 100 with elongated piston skirts 104 have an increased center of gravity, ultimately leading to increases in lateral motion during reciprocation. As such, the piston skirt 104, and the piston 100 as a whole, is more susceptible to eccentric motion which may cause scuffing, increased friction, and reduced engine efficiency. The skirt 104 may additionally include piston pin bosses 116 extending downward from the skirt 104. The piston pin bosses 116 may generally be formed with an aperture 118 configured to receive a piston pin (not shown). For instance, a piston pin may be inserted through the aperture 118 in the piston pin bosses 116, thereby generally securing the skirt 104 to a connecting rod (not shown). The pin bosses 116 may generally define an open area between the pin bosses, e.g., for receiving the connecting rod.

FIG. 1 shows that lands 3 and 4 are smaller in the form of an axial extent (e.g., vertical height) than a second land 2 positioned between an uppermost land 1 of the piston and intermediate land 3. This is a typical configuration of a piston 100. However, known designs such as the piston illustrated in FIG. 1 are vulnerable to eccentric motion within the engine cylinder causing the skirt 104 and lands 108 to come into contact with the cylinder wall thereby leading to detrimental scuffing.

Figure 2:
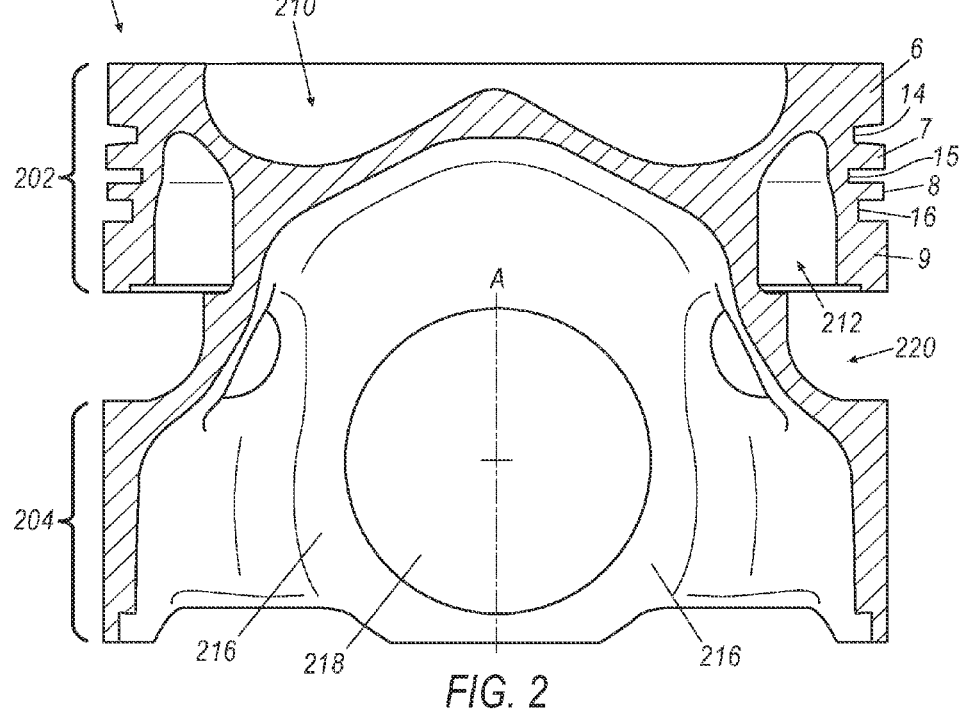
FIG. 2 is a cross-sectional isometric side view of a piston according to an exemplary implementation where the fourth land has a greater axial extent relative to the second land and the piston skirt has a decreased axial extent as compared to the piston skirt of FIG. 1.

FIG. 2 is a cross-sectional isometric side illustration of a piston 200 incorporating the advantages of the present disclosure. The piston 200 may include many components illustrated in FIG. 1, including but not limited to a crown 202, skirt 204, combustion bowl 210, cooling gallery 212, pin bores 216, and aperture 218. The piston crown 202 and skirt 204 may be formed of a heat-resistant metal, such as steel. According to one example, the skirt 204 may generally have an axially extent shorter or less than the axial extent of known designs, such as the skirt 104 illustrated in FIG. 1. Consequently, the skirt 204 according to the present disclosure with a decreased axial extent lowers the center of gravity of the piston 200. A lower center of gravity increases the stability of the piston 200 within the engine cylinder with regards to lateral movement during reciprocating motion, thereby reducing detrimental noise, vibration, and harshness (NVH) during engine operation and consequently prolonging the working life of the piston 200.

Moreover, the piston 200 has a plurality of circumferentially extending lands cast into the piston crown 202. The plurality of lands may include a second land 7 positioned between an uppermost land 6 and an intermediate land 8. In turn intermediate land 8 is positioned between second land 7 and a bottom land 9. Bottom land 9 has a greater axial extent (e.g., vertical height) than its counterpart land 4 in FIG. 1. Land 9 may likewise have a greater axial extent than lands 7 and 8. Additionally or alternatively, bottom land 9 may have a greater axial extent than lands 2 and 3 in prior art FIG. 1. According to one example, top land 6 has a greater axial extent than bottom land 9. The top or first land, being closest to the combustion bowl 210, generally has the greatest axial extent relative to the second, third, and fourth land, as the first land has to compensate for the large combustion force and high temperatures associated with engine operation. However, according to another example, bottom land 9 may have a greater axial extent than top land 6 if operating conditions so permit. That is, the axial extent of the uppermost land may depend at least in part on fuel type (e.g., the combustion force and temperature), and/or load amounts. Accordingly, the engine performance characteristics may permit a top land 6 with a smaller than normal axial extent, in which the bottom land 9 may include a greater axial extent than the top land 6.

According to an illustrative implementation, the piston 200 may be machined or cast to have a concave combustion bowl 210 located on the top of the piston 200. The bowl 210 can be described geometrically as a sectioned off portion of a sphere by intersection with a plane. The concave combustion bowl 210 is symmetrically arranged on the piston top such that a center of the bowl 210 is roughly coincident with a longitudinal axis A of piston 200.

Still referring to FIG. 2, the piston crown 202 includes cast or machined annular grooves 14, 15 & 16 provided about the perimeter or periphery of the crown 202, adjacent to the cooling gallery 212. The annular grooves 14, 15, and 16 may be configured to accommodate the piston rings (not shown). The grooves 14, 15, 16 separate and are defined by adjacent lands.

During engine operation, the piston 200 is attached to a connecting rod (not shown) and reciprocates upwardly and downwardly axially in an associated cylinder or liner. The cylinder or liner is covered with a film of oil on its outer exposed surface by an oil supply and an oil control ring carried in the lowermost piston ring groove 16 disposed between lands 8 and 9. During normal engine operation, reciprocation generates lateral and rotational forces; these two forces impart a non-uniform, irregular or eccentric piston motion within the cylinder or liner. In previously known operation, the eccentric motion of the piston may cause the piston lands and/or skirt to be misaligned with respect to the cylinder or liner wall. The misaligned lands shear off/break through the lubricating oil film otherwise present on the cylinder or liner wall. When the oil film is removed, metal to metal contact and frictional forces in the cylinder-piston system increases, power is lost and engine life may be significantly reduced, resulting in increased risk of scuffing.

The present disclosure minimizes the generation of undesirable and harmful eccentric motions of the piston. In the present exemplary illustration as shown in FIG. 2, the height or axial extent of the second land 7 is reduced as compared to its corresponding counterpart land 2 in the known art represented in FIG. 1. The axial extent of the bottom land 9 in FIG. 2 is increased and is therefore greater than known bottom lands 4. Additionally, the overall axial extent or length of the piston skirt 204 is shortened as compared to skirt 104.

The illustrative piston 200 identifies a direct correlation between: the increased height of the bottom land or guide land 9, a reduced height of the piston skirt 204 and the lowering of the piston's center of gravity, and the elimination of the undesirable lateral and rotational forces present in previous piston implementations. The exemplary piston 200 described notes that the distance defined by the bottom land 9 to be a specific interval of the overall axial extent of crown 202 (e.g., an axial extent of about two (2) to seventeen (17) percent the diameter of the crown 202) to eliminate the harmful lateral and rotational forces. The overall axial extent of skirt 204 is also reduced as compared to the known art.

As illustrated in prior art FIG. 1, pistons 100 are produced with relatively long in the form of axial extent piston skirts 104 and long in the form of axial extent second land 2 height as compared to the intermediate 3 and bottom 4 piston lands. This known configuration of piston lands (e.g., second land 2 with a greater axial extent than the fourth land 4) allows the piston 100 to tilt relative to the associated cylinder or liner during engine operation. Parts of the tilted piston scrape the film of lubricating oil off of the cylinder or liner wall exposing bare metal. In the illustrative embodiment detailed in FIG. 2, increasing the axial size of a land located a greater distance from the heat of combustion, such as the bottom land 9, reducing the height of the second land 7, and decreasing the axial length of the piston skirt 204, consequently reduces and otherwise minimizes the lateral and rotational motion of the piston. Therefore, the lubricating oil film is unbroken and the harmful metal to metal frictional contact is eliminated.

During normal engine operation, a plentiful, uninterrupted source of lubricating oil is available in accordance with the teachings set forth above with respect to FIG. 2 as compared to the teaching of FIG. 1. As noted above, when there is little to no lubrication between a piston and its mating cylinder wall or liner (e.g., the lack of an oil film between the second land and its mating cylinder surface), reduced oil volume and resulting lubrication availability leads to scuffing of the cylinder wall and increased metal to metal contact of the piston to cylinder wall at locations such as that illustrated by land 2 of FIG. 1.

Having a marginal oil film between the second lands and the associated cylinder or liner increases the noise generated by the piston during reciprocation. Another issue relates to blow-by, resulting from undesired clearance between a piston and its mating cylinder wall or liner surface, reducing engine efficiency while also increasing oil consumption.

Therefore, a piston 200 according to the present disclosure including a guide land (e.g., land 9) that is located axially away from the heat of combustion (e.g., the combustion bowl 210) along the outer periphery of the crown 202 reduces the thermal expansion of the guide land since the maximum temperature of that portion of the crown is lower than for the lands closer to the uppermost portion of the piston crown 202 where the combustion bowl 210 is located. In view of the foregoing, it is possible to have tighter tolerances since the radial expansion of the guide land 9 is reduced as compared to lands at a higher temperature. By having tighter tolerances the cold installation clearance between the piston and its mating cylinder or liner surface may be reduced. As such, a land having an increased axial extent as compared to other lands closer to the combustion bowl, but positioned downwardly of the uppermost land, presents significant advantages. The piston surface pressure is redistributed (with lower asperity contact and higher hydro contact because of enhanced lubrication as compared to the prior approaches) that may be quantified by a reduction in friction power loss. Additionally, piston kinetic energy is reduced, which may be quantified by a reduction in mechanical power loss.

Another exemplary effect using bottom land 9 guidance is the hydrodynamic aspect where the oil control ring (OCR) located right above the guide land scrapes the remaining oil on the cylinder wall or liner directly into the gap between the bottom land 9 and mating surface (e.g., liner). This oil cushion prevents asperity contact and therefore reduces friction, improving performance.

The overall reduction in the axial height of the piston 200 because of a desired positioning of a land best able to minimize eccentric motion, in combination with a potential reduced height of the associated skirt as noted above, either individually or together help contribute to the reduction of energy losses. The disclosed enhancements reduce eccentric motion of the type discussed above.

Moreover, as previously noted, additional advantages are realized by minimizing eccentric motion. For example, (1) engine blow-by is reduced, (2) oil consumption is reduced, (3) cylinder wall or liner cavitation occurrences are minimized, and (4) issues related to engine noise, vibration, and harshness (NVH) are also reduced.

It is also envisioned that by having a land such as the bottom land 9 with an increased axial extent, the overall size of a cooling gallery 212 including a region positioned between the skirt 204 and the bottom land 9 may be enhanced as compared to known pistons, increasing cooling channel volume, and thereby intended to increase cooling channel efficiency. The cooling gallery 212 helps to facilitate the placement of oil to the contact surfaces represented by the piston and the cylinder wall or liner to enhance hydrodynamic lubrication as the piston 200 strokes up and down.

According to one example, the uppermost land may be known as L1. The next land (i.e., the second land) may be known as L2. The next land down (i.e., the intermediate land) may be known as L3. Finally, the bottom land may be known as L4. In the current illustrative approach according to FIG. 2, L4 (land 9) is used for piston guidance within the cylinder as opposed to typical embodiments that use L2 (land 2 of the prior art from FIG. 1) for piston guidance. L4

(land 9) is located farther away from the combustion chamber 210 as compared to the other lands and therefore is exposed to a lower operating temperature than L2 (land 2 of the prior art from FIG. 1). In typical approaches radial thermal expansion of L2 (land 2) is greater than L4 (land 9) due to the proximity of L2 (land 2) to the combustion chamber 210 heat. L4 (land 9) expands radially less than L2 (land 2). Therefore, there is less friction of L4 (land 9) in engagement with its mating cylinder wall or liner. In the current illustrative implementation, L4 (land 9) has an enhanced large surface area which has a minimized clearance (0 um to 60 um) with its mating cylinder wall or liner resulting in the benefits discussed above.

In one illustrative approach, land 9 (L4) may have an axial extent of between approximately two (2) to seventeen (17) percent of the overall piston 200 and/or piston crown 202 diameter. The piston skirt height or axial extent may be between approximately ten (10) to fifty (50) percent of the overall piston 200 and/or piston crown 202 diameter. In an exemplary approach the axial extent of an "opening" 220 representing a portion of cooling gallery 212 positioned between the top of skirt 204 and the bottom land 9 may also have a dimension of approximately ten (10) to fifty (50) percent of the piston 200 and/or piston crown 202 diameter.

Additionally, land 9 (L4) may be coated with one of several friction reducing materials to wear resistance. These coatings can be but are not limited to: TiN, CrC, CrN or Cr. The coatings may also be known by such names as Grafal™ and Evoglide™. The coatings can be applied in a variety of ways not limited to: thermal spray, physical vapor deposition or electrochemical plating.

Figure 3:
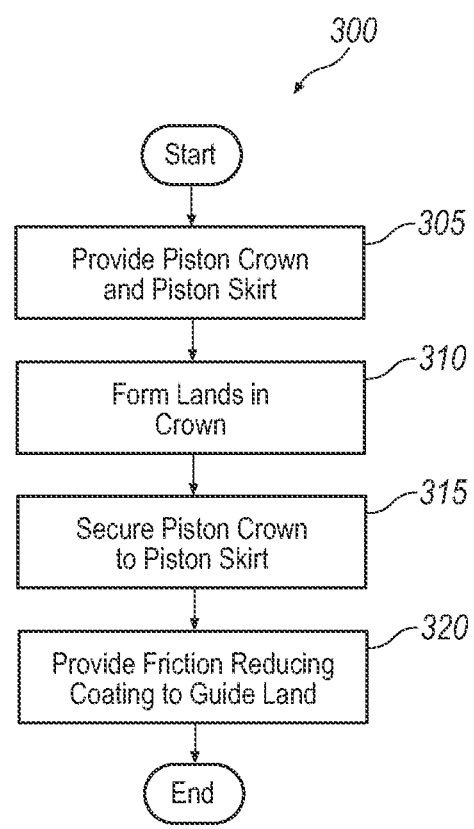
FIG. 3 is a flow chart illustrating a method of assembling the piston of FIG. 2.

FIG. 3 illustrates a method 300 of configuring a piston 200. At block 305, the piston crown 202 and piston skirt 204 may be provided. The piston 200 may have a combustion bowl 210 machined or cast into the crown 204. The piston crown 202 and skirt 204 may define a circumferentially extending cooling gallery 212 about the perimeter of the piston 200. The piston skirt 204 may include a pair of oppositely disposed pin bosses 216 defining a piston pin bore or aperture 218. The skirt 204 may be defined by a skirt axial extent (e.g., height) which may be less than that of a typical piston skirt (e.g., as compared to the piston skirt 104 illustrated in FIG. 1). The exemplary skirt axial extent may be no more than fifty (50) percent of a diameter of the piston 200 or piston crown 202. Accordingly, the skirt axial extent or height, and consequently the overall height of the piston 200, is reduced thereby lowering the center of gravity of the piston 200. Consequently, stability of the piston is increased as it moves within the engine cylinder and eccentric motion is reduced.

At block 310, a plurality of lands may be formed in the piston crown 202. The lands 6, 7, 8, and 9 may be separated by a groove 14, 15, and 16, respectively, that is cast or machined into the crown 202 and which is defined between circumferentially raised adjacent lands. According to one example, the plurality of lands may include a first land having a first axial extent, a second land having a second axial extent, and a third land having a third axial extent. The first land may be near the combustion area (e.g., the combustion bowl 210), the second land may be positioned intermediate the first and third land, and the third land may be away from the region of combustion with respect to the first land. For instance, the first land may be the top or uppermost land 6, the second land may be land 7, and the third land may be the bottom land 9, as illustrated in FIG. 2. The third land may be configured as the guide land having a greater axial extent than the intermediate second land. The axial extent of the third land may be about two (2) to seventeen (17) percent of a diameter of the piston crown 202. By moving the guide land (e.g., the third land) away from the combustion area, the land is exposed to less heat and therefore the thermal expansion seen be the land is decreased. Consequently, less thermal expansion may lead to less oil removed from the engine cylinder walls by way of the land.

According to another example, the piston crown may be composed of four lands (e.g., land 6, 7, 8, and 9), numbered sequentially from the top or uppermost part of the crown down towards the direction of the skirt. Pursuant to one implementation, the fourth or bottom land 9 may have a greater axial extent than the second and third lands 7, 8. The first or uppermost land 6, however, may have the greatest axial extent in relation to the second 7, third 8, and fourth land 9 in order to compensate for the large combustion forces and high temperatures created at the top of the piston (e.g., in the region of the combustion bowl) during engine operation. However, as mentioned above, depending on the performance characteristics of the engine (e.g., combustion force, temperature, load), the bottom guide land 9 may have a greater axial extent than the top or uppermost land 6.

At block 315, the piston crown 202 and skirt 204 may be adjoined or otherwise secured together to form the piston 200. For example, the piston crown 202 and skirt 204 may be joined by a mechanical process, such as welding, brazing, soldering, etc. Conversely, the piston 200 may be cast or machined as a one piece crown 202 and skirt 204.

At block 320, the guide land (e.g., land 9) may be coated with a friction reducing layer or surface to decrease friction and/or wear resistance. Exemplary coatings may include, but are not limited to, TiN, CrC, CrN, or Cr. The coating may be applied via a variety of processes, including thermal spray, physical vapor deposition, or electrochemical plating.

Accordingly, while illustrative implementations of the present disclosure have been shown and described, it is obvious that changes and modifications may be made thereunto without departing from the spirit and scope of the disclosure. For example, in some approaches, a land positioned upwardly of the bottom land, but located sufficiently away from the combustion chamber may still have sufficiently low thermal expansion in operation to have the enhanced axial extent.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many implementations and applications other than the examples provided would be apparent upon reading the above description. It is anticipated and intended that future developments will occur in the arts discussed herein, and that the disclosed systems and methods will be incorporated into such future implementations. In sum, it should be understood that the invention is capable of modification and variation.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A piston, comprising:
a crown including a plurality of lands separated by a groove defined between adjacent lands; and
a skirt secured to the crown;
wherein the plurality of lands includes a first land having a first axial extent, a second land having a second axial extent positioned between the first land and a third land, the third land having a third axial extent, and a fourth land having a fourth axial extent positioned away from a region of combustion in relation to the first and second land, and wherein the fourth land has a greater axial extent than the second land such that an axial guidance surface is predominately provided by the fourth land and the skirt during reciprocating motion in a cylinder or liner; and
wherein the fourth axial extent of the fourth land is approximately 2 to 17 percent of a diameter of the piston crown.

2. The piston of claim 1, wherein at least one of (i) the fourth land extends continuously in a circumferential direction and (ii) the fourth land is continuous with the crown.

3. The piston of claim 1, wherein at least one of the first land is the uppermost land of the crown and the fourth axial extent is greater than the first axial extent.

4. The piston of claim 1, wherein the skirt defines a skirt axial extent, the skirt axial extent being no more than approximately 50 percent of a diameter of the piston crown.

5. The piston of claim 1, wherein the fourth land includes a friction reducing coating.

6. The piston of claim 5, wherein the friction reducing coating includes at least one of TiN, CrC, CrN, and Cr.

7. The piston of claim 1, further comprising an annular opening disposed axially between the fourth land of the plurality of lands and the skirt.

8. The piston of claim 1, wherein the crown and the skirt together define a compression height, and wherein the compression height is approximately 40 to 60 percent of the diameter of the crown.

9. A piston of an internal combustion engine, comprising:
a piston crown including a plurality of lands separated by a groove defined between adjacent lands, the plurality of lands being continuous with the piston crown and including:
a first land having a first axial extent;
a second land having a second axial extent;
a third land having a third axial extent; and
a fourth land having a fourth axial extent, wherein the fourth land is positioned away from a region of combustion with respect to the first land and the second land is positioned between the first land and the fourth land;
a piston skirt coupled to the piston crown; and
an annular opening disposed axially between the plurality of lands and the piston skirt;
wherein the fourth axial extent of the fourth land is greater than the second axial extent of the second land such that an axial sliding surface is predominately provided by the fourth land and the piston skirt; and
wherein the fourth axial extent of the fourth land is approximately 2 to 17 percent of a diameter of the piston crown.

10. The piston crown of claim 9, wherein the fourth land is the bottom land of the crown.

11. The piston crown of claim 9, wherein the first land is the uppermost land of the crown.

12. The piston crown of claim 11, wherein the fourth axial extent is greater than at least the second axial extent and the third axial extent.

13. The piston crown of claim 9, wherein the piston skirt has a skirt axial extent, and wherein the skirt axial extent is no more than 50 percent of a diameter of the piston crown so as to lower the center of gravity of the piston.

14. A method, comprising:
providing a piston crown;
forming a plurality of lands into the piston crown, the plurality of lands being continuous with the piston crown and separated by a groove defined between adjacent lands, wherein the plurality of lands includes at least a first land having a first axial extent, a second land having a second axial extent, a third land having a third axial extent, and a fourth land having a fourth axial extent, wherein the fourth land is positioned away from a region of combustion with respect to the first land and the second land is positioned between the first land and the fourth land; and
providing a piston skirt having a skirt axial extent of approximately 50 percent or less of a diameter of the piston crown, wherein the piston crown and the piston skirt are coupled together to at least partially define a piston;
wherein forming a plurality of lands further includes forming the fourth axial extent to be greater than the second axial extent so that the fourth land and the piston skirt cooperate to lower the center of gravity of the piston via at least predominately defining an axial guidance surface of the piston with a mating cylinder or liner during reciprocating motion; and
wherein the fourth axial extent of the fourth land is approximately 2 to 17 percent of the diameter of the piston crown.

15. The method of claim 14, wherein the piston has a compression height of approximately 40 to 60 percent of the diameter of the piston crown.

16. The method of claim 14, further comprising coating the fourth land with a friction reducing layer, wherein at least one of the layer includes one or more of TiN, CrC, CrN, and Cr, and the layer is applied via at least one of thermal spraying, physical vapor deposition and electrochemical plating.

17. The method of claim 14, wherein providing a piston crown further includes forming an annular opening below the fourth land in relation to the region of combustion, wherein the opening is disposed axially between the fourth land and the piston skirt when the piston crown and the piston skirt are coupled together.

* * * * *

UNITED STATES PATENT AND TRADEMARK OFFICE
CERTIFICATE OF CORRECTION

PATENT NO. : 9,551,291 B2
APPLICATION NO. : 14/166020
DATED : January 24, 2017
INVENTOR(S) : Valerian Ioja et al.

Page 1 of 1

It is certified that error appears in the above-identified patent and that said Letters Patent is hereby corrected as shown below:

On the Title Page

Item (60), Related U.S. Application Data, please add the following missing priority data: "Provisional application No. 61/785,661, filed on March 14, 2013, provisional application No. 61/757,996, filed on January 29, 2013."

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*